United States Patent Office 2,996,387
Patented Aug. 15, 1961

2,996,387
HEXITOL AND HEXITAN PARTIAL ESTERS AND SHORTENING AGENTS CONTAINING SAME
Sol B. Radlove, Chicago, Ill., assignor to The Glidden Company, Cleveland, Ohio, a corporation of Ohio
No Drawing. Filed Sept. 8, 1958, Ser. No. 759,420
8 Claims. (Cl. 99—118)

This invention is concerned with shortening addition agents having surface-active properties, and which are, for example, partial lactic acid-fatty acid esters or sorbitol and/or sorbitol anhydride (sorbitan).

I have discovered that partial esters of the types described above are eminently useful as cake-baking emulsifiers when employed at the moderately low levels (in respect to shortening) to which the baking art is accustomed.

In brief my emulsifiers are prepared from sorbitol (or other hexitol or hexitol anhydride) as the polyhydric alcohol component(s), and from both lower water-soluble hydroxy monocarboxylic acid(s) and fatty acid(s). The acids are employed in a total amount which should theoretically provide about one to two fatty acyloxy groups per polyol molecule and leave at least one to as many as three hydroxyls of each polyol molecule unesterified. My products can be prepared from the foregoing materials by combining all the selected materials together in a single container and then reacting them under esterifying conditions, or by a stepwise treatment wherein, for example, an appropriate fatty acid mono or di-ester of the polyol(s) is subsequently esterified with selected amounts of lactic acid or other hydroxy monocarboxylic acid or acids.

Thus, one object of my invention is to provide cake-baking emulsifiers of the types described hereinabove.

Another object is to provide novel mixed-acid, partial esters of hexitol(s) and/or hexitan(s).

A further object is to provide a shortening agent comprising edible glyceride oil shortening and mixed-acid, partial esters of hexitols and/or hexitol anhydrides.

These and other objects will be understood more fully from the following description of my invention.

Surface active glycerides capable of effective use in cake baking and which are partial or full mixed fatty acid/hydroxy monocarboxylic acid esters of glycerine are known: U.S. Patents 2,480,332, 2,509,414, and 2,690,971. Surface active fatty acid monoesters of hexitols and/or hexitans are also known. The mixed fatty acid/hydroxy acid partial esters of hexitols and hexitans, which are the subject of the present invention, are to the best of my knowledge, novel chemical compositions whose surface active and cake-baking qualities have not heretofore been known.

The following materials are contemplated for use in the preparation of my hereinabove described partial esters.

HEXITOLS

Ten stereoisomers are possible. Those known to occur naturally are d-mannitol, d-sorbitol, d-iditol and dulcitol. They can also be prepared synthetically, as can the remaining stereoisomers. Mannitol and sorbitol are presently available commercially and represent my preferred hexitols. Of the six esterifiable hydroxyls in the hexitols, more than one but not more than three (on an average) are esterified in producing the partial esters of the present invention.

HEXITANS

The hexitols, on losing one mole of water, yield the hexitans contemplated for use here. The products obtained from hexitols by removal of two moles of water (hexides) are not here involved. The hexitans possess four esterifiable hydroxyls, and the products of the present invention represent derivatives thereof wherein more than one but not more than three of them (on an average) are esterified.

THE FATTY ACIDS

While I especially prefer palmitic acid as substantially the sole fatty acid to be employed in preparing my partial esters for cake-baking purposes, other even-numbered, unsubstituted fatty acids of 12–22 carbon atoms can be employed individually or in admixture for other related and/or unrelated uses. The acids can be derived from any source; i.e., natural or synthetic. For cake-baking purposes, I prefer to have at least 50% by weight of the total fatty acids constituted by palmitic acid.

THE HYDROXY MONOCARBOXYLIC ACIDS

As noted above, my present purposes are served by using the water-soluble, lower hydroxy monocarboxylic acids. Such acids can contain up to 6 carbon atoms. Lactic acid is especially preferred.

PROPORTIONS

While the proportions of starting materials have been indicated hereinabove, they can be summarized as follows:

| | Moles |
|---|---|
| Polyol selected from the group consisting of hexitol(s) and hexitan(s) and mixtures thereof | 1 |
| Fatty acid (12–20 carbons) | 1–2 |
| Hydroxy monocarboxylic acid | .5–2 |

When these proportions of starting materials are fully esterified, the finished product should, on an average, contain at least one fatty acid combined with each molecule of polyol, and should be composed in part of partial esters having at least one and not more than three unesterified hydroxyls per molecule. It should be appreciated, however, that the reaction mass is a mixture of esters some molecules of which will not correspond to theory. It is for this reason that the average distribution of the various radicals should be considered.

METHODS OF PREPARATION

While numerous methods of synthesis of my average products will occur to skilled chemists, I found that simple esterification of the reactants under mild conditions with removal of formed water results in useful products. As briefly indicated above, such esterification can be carried out in a one-step operation by introducing all the reactants into the same vessel and proceeding to react them simultaneously, or it can be carried out in a stepwise operation where first one kind of acid is esterified with the polyol(s) after which the other kind of acid is introduced and esterified. This method is exemplified hereinafter through the use of the commercially-available sorbitan monopalmitate (Atlas Powder Company's "Span 40") as a partial fatty acid ester into which residues of lactic acid are subsequently introduced by direct esterification.

USES OF MY PARTIAL ESTERS

As noted above, my partial ester products possess surface active qualities which commend them for multitudinous uses either in edible fields or in industrial fields. I have found them to be especially well adapted for cake-baking functions, however, and these aspects of its utility are exemplified hereinafter. Because of this special utility, I herein contemplate the provision of novel shortening agents which can be marketed as articles of commerce and which involve the blending of my partial esters with edible triglycerides having shortening qualities. The latter can be edible, normally-liquid triglyceride oils such as salad oils, or conventional plasticized shortenings or margarines, or they can be the more recent innovations termed "fluid" or "pumpable" shortenings. The amount of my partial esters in such shortening agents can vary rather widely from as little as about 1% to as much as 12–15% by weight. My partial esters need not be the sole emulsifier or surface active agent in such shortening products since for some specialty bakery products it is frequently desirable to combine the functional properties of two or more different emulsifiers. The shortening agents can, of course, include various other materials such as antioxidants, coloring matter, flavoring, etc.

The following examples illustrate the principles of my invention and include the best modes presently known to me for practicing those principles.

*Example 1*

The following materials were used:

|  | G. |
|---|---|
| Sorbitan monopalmitate (0.2 mole) (Atlas Powder Company's "Span 40") | 80 |
| Lactic acid (0.2 mole in form of 70% commercial acid) | 24.5 |

These reactants were mechanically agitated in a system fitted with a steam heated vertical condenser connected to a vacuum system. Carbon dioxide was bubbled through over a ten hour period, during which time the temperature was maintained at 130–135° C. with a pressure of 180–200 mm. of mercury. Acid values were taken to follow the course of the reaction. After three hours the acid value was 31; after ten hours 12.3. The resulting product was a dark brown waxy solid having a saponification value of 212 (theory 337) and an acetyl value of 196 (theory based on acetyl value of 232 for Span 40 was 203). The functional qualities of the product are illustrated in Example 5.

*Examples 2–4*

The following materials were used in the gram-molar proportions designated:

| Material | Example | | |
|---|---|---|---|
| | 2 | 3 | 4 |
| | Moles | Moles | Moles |
| Lactic acid (85% by wt.) | 0.5 | 1.0 | 2.0 |
| Sorbitol (Atlas "Sorbo-L"; 70% Aqueous sol'n) | 1.0 | 1.0 | 1.0 |
| Palmitic Acid (Armour's "Neofat 16") | 1.0 | 1.0 | 1.0 |

A 500 ml. flask was equipped with a power stirrer, a steam jacketed reflux condenser connected to a water aspirator, a nitrogen supply and a thermometer. The flask was charged with the sorbitol and palmitic acid. Heat was applied to bring the contents to 90° C. Lactic acid which had been preheated to 90° C. was then added and nitrogen was started bubbling through the mass. Vacuum was applied to the extent indicated below and the temperature of the mass was raised to and held at 195–205° C. for:

| Time interval: | Vacuum |
|---|---|
| 2 hours | inches__ 2–3 |
| 3 hours | do____ 15 |
| 2 hours | Full |

At the end of the 7 hours, the reaction mixture was cooled and washed four times with hot water, the solids being recovered by centrifuging. The material was then dried in full vacuum at 55–60° C. after which 0.1 gram citric acid was added and the mixture heated to 150° C. under full vacuum for 15 minutes. The following tabulation summarizes the properties of the different batches:

| Example | Sap. No. | Acid No. | Ester No. |
|---|---|---|---|
| 2 | 166 | 12.7 | 153 |
| 3 | 194.5 | 8.20 | 186.3 |
| 4 | 247.4 | 6.60 | 240.8 |

The cake-baking qualities of the products are illustrated in Example 5.

*Example 5*

The emulsifiers of Examples 1–4 were tested for cake-baking qualities in the following recipe:

WHITE CAKE MIX

| | Percent by weight |
|---|---|
| Granulated sugar | 43.90 |
| Cake flour | 39.00 |
| Salt | 1.00 |
| Non-fat dry milk solids | 2.00 |
| Sodium bicarbonate | .45 |
| Sodium acid pyrophosphate | .35 |
| Monocalcium phosphate | .30 |
| Shortening | 13.00 |

The emulsifier and shortening of each test were blended together and plasticized before being used in the recipe. The emulsifiers were tested at levels of 5% and 10% by wt. on the shortening. As a comparison emulsifier, the glyceryl lactopalmitate product of Example 1, U.S. Patent 2,690,971 was used at the same levels.

The batter make up for the above recipe was as follows:

| | Grams |
|---|---|
| Dry mix (as above) | 567 |
| Water | 120 |
| Egg whites | 35 |

Mix for 2 min. at high (4th speed on power mixer (Kitchen Aide)). Add:

| Water | 120 |
|---|---|
| Egg whites | 35 |

Mix 2 min. at medium speed (2nd) on mixer.

Bake at 350° F. for approximately 22 minutes.

The following table summarizes the data secured from the tests (sl. represents "slightly"):

EMULSIFIER AT 5% LEVEL

| Emulsifier | Batter | | Cake | |
|---|---|---|---|---|
| | Condition | Sp. Gr. | Vol. (ml.) | Texture |
| Example 1 above | Smooth and sl. thin. | .69 | 1,100 | Close and even; sl. dark and soggy. |
| Example 2 above | do | .74 | 1,080 | Do. |
| Example 3 above | do | .685 | 1,060 | Do. |
| Example 4 above | do | .750 | 1,070 | Do. |
| Example 1, U.S. 2,690,971. | Smooth | .700 | 1,140 | Almost fine and even. |

EMULSIFIER AT 10% LEVEL

| Emulsifier | Batter | | Cake | |
|---|---|---|---|---|
| | Condition | Sp. Gr. | Vol. (ml.) | Texture |
| Example 1 above | Smooth and sl. thin. | .71 | 1,140 | Close and even; sl. dark; sl. soggy. |
| Example 2 above | do | .725 | 1,120 | Do. |
| Example 3 above | do | .65 | 1,130 | Do. |
| Example 4 above | do | .750 | 1,070 | Do. |
| Example 1, U.S. 2,690,971. | Smooth | .700 | 1,140 | Almost fine and even. |

The cakes were all judged to be excellent cakes although the emulsifier of U.S. Patent 2,690,971 produced cakes slightly superior in color, grain, texture and eating. It should be noted that each of the emulsifiers produces batters of remarkably low specific gravity when compared with mono- and di-glyceride emulsifiers. The latter seldom give batters having a specific gravity below about 90.

*Example 6*

The emulsifiers of Examples 1–4 were tested at a 3% level in a household (hand-mix) cake recipe set forth below. For comparison purposes mono- and di-glycerides (SGF) were also tested in the same recipe, but at a 4% level on the shortening. The emulsifier and shortening used in each test were blended together and plasticized before being used in the recipe.

HOUSEHOLD CAKE RECIPE

7¾ oz. cake flour
10¼ oz. sugar
3½ oz. shortening containing emulsifier
½ oz. baking powder
¼ oz. salt
5½ oz. milk The foregoing ingredients were mixed together for two minutes at a medium speed on a power mixer. Then 3 oz. milk
4½ oz. egg white
¼ oz. vanilla extract were added and the whole was mixed for two minutes more at a medium speed. 15 oz. of the batter was weighed into an eight-inch pan and the batter was baked at approximately 365° F. for 21 minutes.

The results of the tests are summarized in the following table.

| Emulsifier | Batter | | Cake | | | |
|---|---|---|---|---|---|---|
| | Condition | Sp. Gr. | Wt. (oz.) | Volume (ml.) | Volume/lb. | Texture |
| SGF at 4% | Smooth | .910 | 13.87 | 1,130 | 1,300 | Sl. coarse, smooth top. |
| Example 1 above | ...do | .882 | 13.70 | 1,130 | 1,320 | Do. |
| Example 2 above | ...do | .860 | 13.60 | 1,155 | 1,360 | Sl. coarse. |
| Example 3 above | ...do | .872 | 13.65 | 1,125 | 1,325 | Sl. coarse, smooth top. |
| Example 4 above | ...do | .848 | 13.71 | 1,060 | 1,230 | |

*Example 7A and 7B*

| Material | Example | |
|---|---|---|
| | 7A, moles | 7B, moles |
| Lactic acid (80% by wt.) | 1.0 | 0.5 |
| Sorbitol (70% aqueous sol'n) | 0.5 | 0.5 |
| Palmitic acid (Armour's "Neofat 16") | 1.0 | 1.0 |

In each example, the specified mole portions of materials were reacted as described in detail in Examples 2–4. The product, in each instance, was a waxy dark brown substance having the following properties:

| Example | Sap. No. | Acid No. | Acetyl Value |
|---|---|---|---|
| 7A | 248 | 4.6 | 89.5 |
| 7B | 196 | 3.7 | 90.3 |

*Baking tests.*—Samples above were checked in liquid shortening as well as in plastic shortening. Results were as follows:

COTTONSEED OIL BASE (LIQUID SHORTENING)

| | Volume, cc./lb. | Texture |
|---|---|---|
| Example 7A; 5% | 1,200 | Corn-bread like, very poor, rounded side dark center. |
| Example 7B; 5% | 1,290 | Even texture, much better than above. |

DURKEE'S CREAMTEX BASE (PLASTIC SHORTENING)

| | | |
|---|---|---|
| Example 7A; 3% | 1,250 | Fine, rounded sides. |
| Example 7B; 3% | 1,180 | Fine, but compressed. |

Volumes of all cakes were low according to Durkee's "Dexo" cake standards. Best volumed cake was liquid shortening containing 5% of Example 7B.

Having described my invention, what I claim is:

1. As an edible composition of matter adapted for use as a baking emulsifier, the partial ester reaction products resulting from substantially complete esterification of: about one molar equivalent of polyhydric alcohol selected from the group consisting of hexitols, hexitans, and mixtures thereof; about one to two molar equivalents of even numbered, unsubstituted fatty acid having 12–22 carbon atoms; and from about 0.5–2.0 molar equivalents of edible, lactic acid, said reaction products containing, on an average, at least one fatty acid esterified with each molecule of polyhydric alcohol and being mixed esters composed in part of partial esters having at least one and not more than three unesterified hydroxyl groups per ester molecule.

2. A composition of matter as claimed in claim 1 which has been washed to remove water-solubles therefrom.

3. A composition as claimed in claim 1 wherein the lactic acid is directly esterified with sorbitan mono-fatty acid acid ester and wherein the fatty acid of said sorbitan ester is an even numbered unsubstuted acid having 12–22 carbon atoms.

4. As an edible composition of matter adapted for use as a baking emulsifier, mixed fatty acid/hydroxy mono-carboxylic acid partial esters of polyol selected from the class consisting of hexitols, hexitans, and mixtures thereof, said partial esters having an average of about one to two molecules of combined fatty acid esterified with each molecule of polyol and having on an average not less than one nor more than about three unesterified hydroxyl groups per molecule of polyol; said fatty acids being even numbered, unsubstituted acids having 12–22 carbons per molecule, of which at least 50% by weight is palmitic acid, and said hydroxy mono-carboxylic acid being edible lactic acid.

5. A composition as claimed in claim 4 which has been washed to remove water-solubles.

6. A composition as claimed in claim 4 wherein the lactic acid is directly esterified with sorbitan mono-palmitate.

7. A shortening agent comprising edible triglycerides having shortening properties and about 1–15% by weight on the shortening of a composition as claimed in claim 1.

8. A shortening agent comprising edible triglycerides having shortening properties and about 1–15% by weight on the shortening of a composition as claimed in claim 6.

References Cited in the file of this patent

UNITED STATES PATENTS

| 2,329,166 | Tucker | Sept. 7, 1943 |
| 2,864,703 | Schulman | Dec. 16, 1958 |